United States Patent
Kishi et al.

(10) Patent No.: US 11,023,155 B2
(45) Date of Patent: *Jun. 1, 2021

(54) PROCESSING EVENT MESSAGES FOR CHANGED DATA OBJECTS TO DETERMINE A STORAGE POOL TO STORE THE CHANGED DATA OBJECTS

(71) Applicant: INTERNATIONAL BUSINESS MACHINES CORPORATION, Armonk, NY (US)

(72) Inventors: Gregory T. Kishi, Oro Valley, AZ (US); Joseph W. Dain, Vail, AZ (US); Nilesh P. Bhosale, Pune (IN); Abhishek Jain, Baraut (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/174,276

(22) Filed: Oct. 29, 2018

(65) Prior Publication Data

US 2020/0133554 A1    Apr. 30, 2020

(51) Int. Cl.
*G06F 11/00* (2006.01)
*G06F 3/06* (2006.01)
(Continued)

(52) U.S. Cl.
CPC ............ *G06F 3/0647* (2013.01); *G06F 3/067* (2013.01); *G06F 3/0619* (2013.01); *G06F 3/0644* (2013.01); *G06F 3/0659* (2013.01); *G06F 9/546* (2013.01); *G06F 11/1004* (2013.01); *G06F 16/2365* (2019.01); *G06F 21/6245* (2013.01)

(58) Field of Classification Search
USPC ......................................... 714/799, 800–805
See application file for complete search history.

(56) References Cited

U.S. PATENT DOCUMENTS 6,092,059 A    7/2000  Straforini et al.
8,407,805 B2   3/2013  Warrington et al.
(Continued)

OTHER PUBLICATIONS

Anonymous, "Automated Aggregate Threshold Data Preservation" dated Jan. 11, 2011, An IP.com Prior Art Database Technical Disclosure, IP.com No. IPCOM000202949D, Total 4 pages.
(Continued)

*Primary Examiner* — Albert Decady
*Assistant Examiner* — Osman M Alshack
(74) *Attorney, Agent, or Firm* — Konrad, Raynes, Davda and Victor LLP; David W. Victor

(57) ABSTRACT

Provided are a computer program product, system, and method for determining a storage pool in which to store a data object. Event messages are received. Each event message includes metadata on an object updated in a storage pool of a plurality of storage pools, at least two of the storage pools have different reliability ratings. The event messages are added to a message queue. A determination is made of a data classification of a changed data object indicated in an event message in the message queue. The changed data object is moved to a storage pool having a reliability rating satisfying a reliability rating associated with the data classification of the changed data object.

26 Claims, 7 Drawing Sheets

(51) Int. Cl.
*G06F 9/54* (2006.01)
*G06F 21/62* (2013.01)
*G06F 11/10* (2006.01)
*G06F 16/23* (2019.01)

(56) References Cited

U.S. PATENT DOCUMENTS

| | | | |
|---|---|---|---|
| 8,522,050 | B1 | 8/2013 | Wakerley |
| 8,590,050 | B2 | 11/2013 | Nagpal et al. |
| 8,595,595 | B1 | 11/2013 | Grcanac et al. |
| 8,751,424 | B1 | 6/2014 | Wojcik et al. |
| 8,805,779 | B2 | 8/2014 | Ficara et al. |
| 9,026,497 | B2 | 5/2015 | Gokhale et al. |
| 9,135,266 | B1 | 9/2015 | Makin |
| 9,632,878 | B1 | 4/2017 | Maccanti et al. |
| 9,734,169 | B2 | 8/2017 | Redlich et al. |
| 9,805,192 | B1 | 10/2017 | Gates et al. |
| 9,846,784 | B1 | 12/2017 | Murray et al. |
| 10,089,287 | B2 | 10/2018 | Rebstock et al. |
| 10,200,470 | B1 | 2/2019 | Chakraborty et al. |
| 10,324,804 | B1 | 6/2019 | Patwardhan et al. |
| 2007/0124659 | A1 | 5/2007 | Moore et al. |
| 2008/0256183 | A1 | 10/2008 | Flynn et al. |
| 2010/0274750 | A1 | 10/2010 | Oltean et al. |
| 2011/0107042 | A1 | 5/2011 | Herron |
| 2011/0173404 | A1 | 7/2011 | Eastman et al. |
| 2015/0074052 | A1 | 3/2015 | Srinivasan et al. |
| 2015/0142752 | A1* | 5/2015 | Chennamsetty ...... G06F 16/113 707/665 |
| 2015/0324609 | A1* | 11/2015 | Grubel ................. H04L 63/105 726/26 |
| 2017/0091047 | A1 | 3/2017 | Bangalore et al. |
| 2017/0104756 | A1 | 4/2017 | Rosenthal et al. |
| 2017/0132186 | A1 | 5/2017 | Plummer |
| 2017/0262520 | A1 | 9/2017 | Mitkar et al. |
| 2018/0268166 | A1 | 9/2018 | Alberton et al. |
| 2019/0044809 | A1 | 2/2019 | Willis et al. |
| 2019/0356717 | A1* | 11/2019 | Chen ..................... H04L 65/607 |

OTHER PUBLICATIONS

"IBM Cloud Object Storage System Definitive Guide to Dispersed Storage", IBM Corporation, [online] [retrieved Sep. 27, 2018] https://www.ibm.com/support/knowledgecenter/STXNRM_3.13.4/coss.doc/pdfs/coss_dispersed_book.pdf, pp. 40.
"Erasure code", Wikipedia, [online][retrieved Sep. 27, 2018], https://en.wikipedia.org/wiki/Erasure_code, pp. 5.
"Guide to Data Protection Best Practices" dated 2016, Tanberg Data, Total 12 pages.
IBM, "Backup Policy Management Across Heterogeneous Environments" dated Feb. 8, 2007, An IP.com Prior Art Database Technical Disclosure, IP.com No. IPCOM000146230D, Total 3 pages.
IBM, "Managing Local Backups in the Context of Policy in Shared Storage Environments", dated Apr. 21, 2006, An IP.com Prior Art Database Technical Disclosure, IP.com No. IPCOM000135698D, Total 3 pages.
O. Khan, et al., "Rethinking Erasure Codes for Cloud File Systems:Minimizing I/O for Recovery and Degraded Reads", pp. 14.
Orlando, K. et al., "IBM ProtecTIER Implementation and Best Practices Guide", dated Jun. 2016, Fourth Edition, International Technical Support Organization, Doc. No. SG24-8025-03, Total 512 pages.
List of Patents or Patent Applications Treated as Related, dated Nov. 27, 2018, pp. 2.
US Patent Application, dated Aug. 31, 2018, for U.S. Appl. No. 16/120,179 (18.806), invented by Joseph W. Dain, Total 33 pages.
US patent Application, dated Oct. 29, 2018, for U.S. Appl. No. 16/174,272 (22.156), invented by Gregory T. Kishi, Total 38 pages.
US patent Application, dated Nov. 15, 2018, for U.S. Appl. No. 16/927,93 (22.157), invented by Joseph W. Dain, Total 36 pages.
US patent Application, dated Nov. 15, 2018, for U.S. Appl. No. 16/192,795 (22.158), invented by Joseph W. Dain, Total 35 pages.
Office Action, dated Jun. 10, 2020, for U.S. Appl. No. 16/120,179 (18.806), invented by Joseph W. Dain, Total 29 pages.
Office Action, dated Jun. 2, 2020, for U.S. Appl. No. 16/174,272 (22.156), invented by Gregory T. Kishi, Total 31 pages.
Response to Office Action, dated Aug. 31, 2020, for U.S. Appl. No. 16/120,179 (18.806), invented by Joseph W. Dain, Total 15 pages.
Response to Office Action, dated Aug. 30, 2020, for U.S. Appl. No. 16/174,272 (22.156), invented by Gregory T. Kishi, Total 11 pages.
Office Action, dated Nov. 3, 2020, for U.S. Appl. No. 16/192,793 (22.157), invented by Joseph W. Dain, Total 55 pages.
Office Action, dated Nov. 3, 2020, for U.S. Appl. No. 16/192,795 (22.158), invented by Joseph W. Dain, Total 54 pages.
Final Office Action, dated Dec. 3, 2020, for U.S. Appl. No. 16/120,179 (18.806) filed Aug. 31, 2018, Total 30 pages.
Notice of Allowance, dated Dec. 17, 2020, for U.S. Appl. No. 16/174,272 (22.156), invented by Gregory T. Kishi, Total 30 pages.
Response to Office Action1, dated Feb. 1, 2021, for U.S. Appl. No. 16/192,793 (22.157), invented by Joseph W. Dain, Total 11 pages.
Response to Office Action, dated Feb. 1, 2021, for U.S. Appl. No. 16/192,795 (22.158), invented by Joseph W. Dain, Total 11 pages.

* cited by examiner

Message Queue Subscriber Information

PROCESSING EVENT MESSAGES FOR CHANGED DATA OBJECTS TO DETERMINE A STORAGE POOL TO STORE THE CHANGED DATA OBJECTS

BACKGROUND OF THE INVENTION

1. Field of the Invention

The present invention relates to a computer program product, system, and method for determining a storage pool for changed data objects.

2. Description of the Related Art

Data objects in a large-scale storage environment may be stored in storage pools based on a characteristic of the data objects. As data is generated and modified at ever increasing rapid speeds and the amount of data exponentially increases, the computational efforts to classify data for storage purposes based on organizational policies likewise increases.

Further, parity and error codes may be generated for data to recover a data object in the event a part of a data object is lost. An erasure code is a forward error correction (FEC) code for a binary erasure channel, which transforms a message of symbols into a longer message (code word) with parity codes such that the original message can be recovered from a subset of the symbols in the longer message. An erasure code provides redundancy by breaking objects up into smaller fragments and storing the fragments on different storage devices. Such erasure codes are frequently being used in large scale cloud storage environments.

There is a need in the art for improved techniques to classify data to determine where to store data in distributed storage locations.

SUMMARY

Provided are a computer program product, system, and method for determining a storage pool in which to store a data object. Event messages are received. Each event message includes metadata on an object updated in a storage pool of a plurality of storage pools, at least two of the storage pools have different reliability ratings. The event messages are added to a message queue. A determination is made of a data classification of a changed data object indicated in an event message in the message queue. The changed data object is moved to a storage pool having a reliability rating satisfying a reliability rating associated with the data classification of the changed data object.

With the above embodiment, information on change data objects is provided to a message queue for immediate processing to determine whether to move the changed data object to a different storage pool. This immediate processing of messages added to a message queue allows for fast determination of changed data objects that are subject to data classification to determine whether to move the data object to a storage pool having a reliability rating associated with the data classification. The described embodiments provide a mechanism to ensure that information on changed data objects is provided in real-time to the message queues. The message queues are then processed to determine whether the changed data objects indicated in the message queues have a new reliability rating requiring that the changed data object be moved to a storage pool satisfying the changed reliability rating.

In a further embodiment, a determination is made from the event messages in the message queue of changed data objects having metadata indicating the data object is likely to have a data classification associated with a high reliability storage pool. The data classification is determined from the changed data object having metadata indicating the data object is likely to have a data classification associated with the high reliability storage pool.

With the above embodiment, first the metadata in the event messages in the message queues is processed to determine changed data objects whose metadata indicates the changed data object is likely to have a data classification associated with a high reliability storage pool. The data classification is then determined for objects that are already determined to be likely to have a data classification associated with a high reliability storage pool. In this way, computational resources are conserved by only performing the data classification, which may be computationally expensive, with respect to changed data objects having metadata indicating a likelihood of a data classification associated with a high reliability storage pool.

In a further embodiment, the metadata indicating whether the changed data object is likely to have a data classification associated with a high reliability storage pool comprises at least a plurality of: an identity of a storage storing the data object; a file path of the data object; and a facet describing data in the data object.

With the above embodiment, a fast determination is made of whether a changed data object is likely to have a high reliability based on metadata maintained in the database, such as the storage storing the data object, a file path, and a facet describing the data. The consideration of such metadata to determine a likelihood of a high reliability is substantially less computationally expensive than performing a data classification of the data object and thus can be used to avoid performing data classification of changed data objects unlikely to have a high reliability rating.

Ina further embodiment, a determination is made as to whether the changed data object is stored in a storage pool having a reliability rating satisfying the reliability rating associated with the data classification. Moving the changed data object is performed in response to determining that the data object is stored in a storage pool having a reliability rating that does not satisfy the reliability rating associated with the data classification.

With the above embodiment, changed data objects are moved when there is a new data classification associated with a reliability rating that is not satisfied by the storage pool currently storing the changed data object.

In a further embodiment, there is an association of data classifications to storage pool reliability ratings. Each data object is stored in a storage pool having a storage pool reliability rating satisfying a storage pool reliability rating associated with a data classification of the data object.

In a further embodiment, a reliability rating indicates a number of units of data of a data object that can be lost with the data object still being recoverable. A higher reliability rating indicates that a greater number of units of data can be lost than with a lower reliability rating.

In a further embodiment, the determining the data classification comprises initiating a deep inspection of the data object to determine a data classification of the changed data object.

In a further embodiment, the data classification indicates one of a plurality of levels indicating at least one of a sensitivity level of the data object and a criticalness of the data object, wherein levels associated with a higher data sensitivity or higher data criticalness are assigned a higher reliability rating than levels associated with lower data sensitivity or lower criticalness.

In a further embodiment, a data object assigned to a storage pool is divided into data units to store on a plurality of storage devices. A reliability rating indicates a maximum number of data units that can be lost and still allow for recovery of the data object, wherein a first reliability rating is higher than a second reliability rating if the first reliability rating allows for a greater number of data units to be lost and still recover the data object than the second reliability rating.

In a further embodiment, a forward error correction algorithm is used to divide a data object into data units and compute parity data for the data units to store on the plurality of storage devices, wherein each reliability rating indicates a width n of a number of data units into which a data object is divided and a threshold k indicates a number of the data units needed to retrieve the data object, wherein the reliability rating is based on a difference of n−k.

In a further embodiment, a plurality of message queues and consumer processes, each of the consumer processes assigned to process event messages from one of the message queues. The message queues receive event messages for changed data objects stored in storage pools. In response to adding an event message to the message queue, a determination is made of consumer process subscribed to the message queue to which the event message was added. Notification is sent to the determined consumer process to cause the determined consumer process to read the event message added to the message queue.

With the above embodiments, multiple message queues are provided to allow for processing by different consumer processes that subscribe to message queues so as to be notified when an event message is added to the message queue. This immediate notification to a subscribed consumer to process the event message just added to the message queue allows for an immediate determination of whether a changed data object just updated and indicated in the message queue needs to be moved to a new storage pool In a further embodiment, the event messages are generated immediately after modifying changed data objects to provide information on real-time changes to changed data objects to the at least one message queue and the database.

With the above embodiment, event messages having information on changed data objects are immediately generated after the data object is changed to provide for immediate processing of the event messages added to the message queues immediately after the data object is changed.

DETAILED DESCRIPTION

Figure 1:
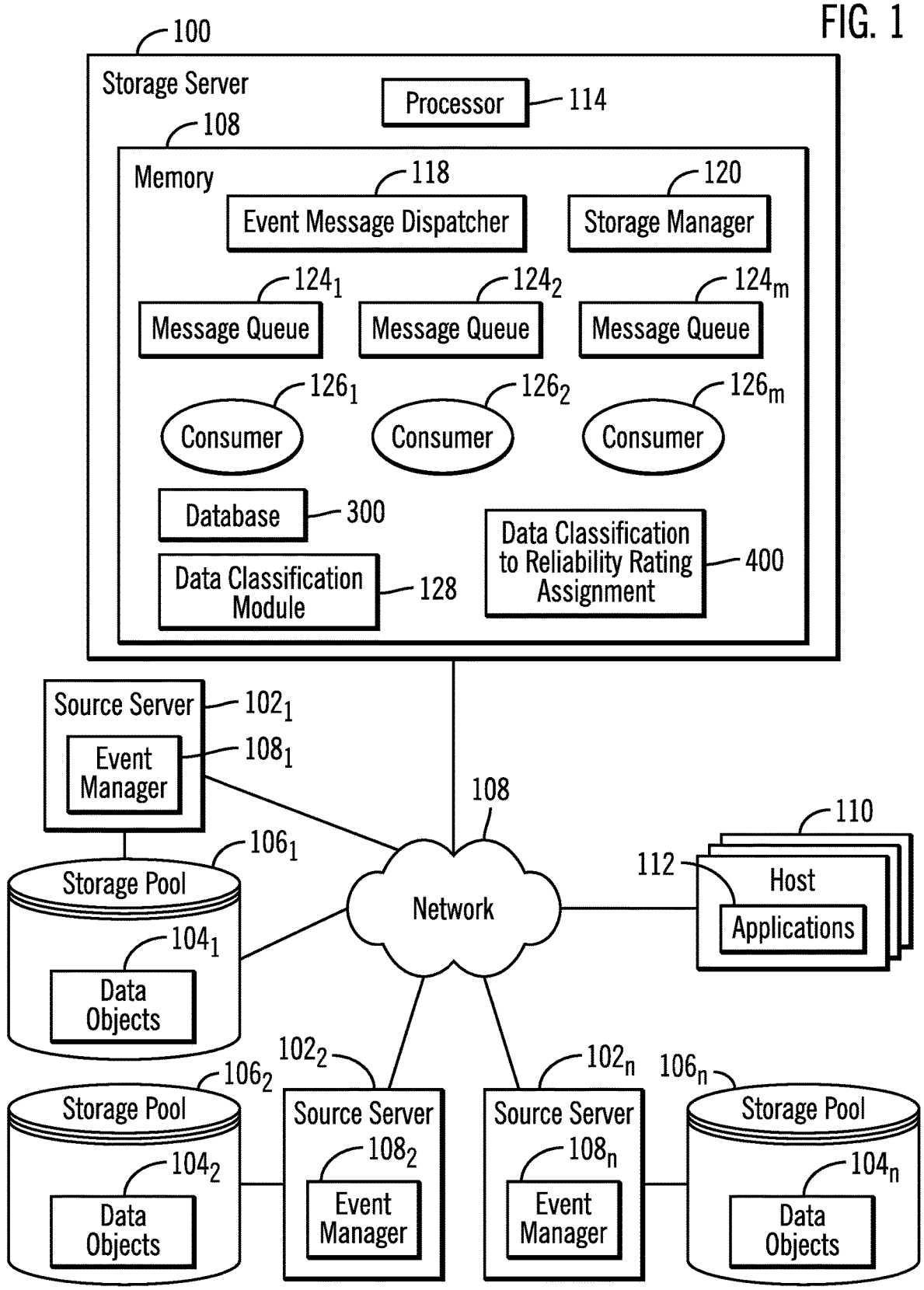
FIG. 1 illustrates an embodiment of a storage environment.

Files in large storage environments having files distributed across numerous heterogeneous storage systems may be stored in different storage pools depending on classifications of the data, such as being sensitive (e.g., personal information such as social security number, financial information, etc.) or critical data (e.g., mission critical data for system operations). Certain storage pools for storing enterprise data may have higher reliability than other storage pools to store data in a manner that provides more redundancy to allow for greater chances of recovery in case of failure. To direct files and data objects to an appropriate storage pool based on a sensitivity/critical characteristic of data, the system will scan numerous files, such as billions of files, in the distributed storage and file systems, to determine their sensitive/critical classification, which may change as the file is modified, to determine the storage pool in which to store a file. One problem with current scanning techniques is that as a scale of the number of files in distributed file systems increases to several billion files and database records, the time and computational effort to scan objects across different storage pools substantially increases.

Described embodiments provide improvements to computer technology for selecting storage pools to store data objects by substantially reducing the time to determine a classification of data and determine a storage pool that is appropriate for the data by having the source or client systems generate in real-time event messages having information on changed data objects that are sent to a storage server to dispatch to message queues. The event messages are processed from the message queues to add to a database. The database may be queried for changed data objects satisfying an investigation criteria indicating a likelihood the data has sensitive/critical data and should be stored in a high reliability storage pool to very quickly determine from the database, such as from a fast database index, changed data objects that should be stored in a high reliability storage pool. In this way, a database is populated with information on changed data objects in real-time from messages generated from source systems in real-time, and this real-time database may be searched to immediately determine changed data objects that satisfy an investigation criteria, such as files more likely to have sensitive/critical data, to subject to deep data inspection to determine the data classification and whether the data object should be stored in a high reliability storage pool.

In a further embodiment, the determination of changed data objects may be immediately determined from the message queues by notifying a consumer process when an event message is added to a message queue. The notified consumer process reads an event message from the message queue for which the notification was sent and immediately determines whether this recently modified data object should be subject to further inspection to determine a data classification and corresponding reliability rating and whether the data object is stored in an appropriately reliable storage pool.

With the described embodiments, event messages on changed data objects from source systems in a distributed storage environment may be processed to determine, in real-time, whether a changed data object satisfies an investigation criteria to be subject to further deep inspection to determine the appropriate reliability rating for a storage pool to store the data object. After the deep classification inspection, the changed data objects may be moved from a storage pool that does not have a reliability rating satisfying the reliability rating associated with the determined classification to a storage pool having a reliability rating satisfying that of the classification.

FIG. 1 illustrates an embodiment of a backup storage environment including a storage server 100 that receives event messages 200 (FIG. 2) from source servers $102_1$, $102_2 \ldots 102_n$ that are generated when a source server $102_1$, $102_2 \ldots 102_n$ applies an update to a data object $104_1$, $104_2 \ldots 104_n$ to a storage pool $106_1$, $106_2 \ldots 106_n$ managed by the source server $102_i$, where the update to a data object in a source data set $104_i$, such as a delete, modification or adding of a data object. A data object may comprise a file, database object, logical blocks, volume, chunks, extents or any other storage unit in which data may be separately manipulated and addressed. Event managers $108_1$, $108_2 \ldots 108_n$ at the source servers $102_1$, $102_2 \ldots 102_n$ create and send the event messages 200 to the storage server 100 upon receiving a modification to a data object from an application 112 in a host system 110 in real-time before the modification is applied to the storage pool $106_i$. In this way, the storage server 100 receives event messages 200 on modifications to data objects immediately in real-time when the changes are made, and in certain embodiments before the changes are applied to the storage pool $106_i$.

The storage server 100 includes a processor 114, such as one or more processor devices, and a memory 108 having program code executed by the processor 114, including an event message dispatcher 118 to process event messages 200 from event managers $108_1$, $108_2 \ldots 108_n$ and a storage manager 120 to determine an appropriate storage pool $106_i$ for modified data objects. The event message dispatcher 118 receives event messages 200 and adds the messages to one or more message queues $124_1$, $124_2 \ldots 124_m$ in the memory 116. For instance there may be a message queue $124_i$ for each storage pool $106_i$ and an event message 200 for an update to a data object at one of the storage pools $106_1$, $106_2 \ldots 106_n$ is added to the message queue $124_i$ for the storage pool $106_i$ having the updated data object. The memory 116 may further include one or more consumers $126_1$, $126_2 \ldots 126_m$ to process event messages in one or more of the message queues $124_1$, $124_2 \ldots 124_m$ to convert the information on an updated data object in an event message 200 to a database record $300_i$ (FIG. 3) to store in a database 300.

The storage manager 120 maintains a data classification-to-reliability rating assignment 400 that indicates for different data classifications a reliability rating of the storage pool $106_1$, $106_2 \ldots 106_n$ in which data having the data classification should be assigned. A reliability rating may indicate the extent to which a data object $104_i$ may be recovered given a certain amount of the data object $104_i$ is lost or has errors. In an embodiment where the storage pools 106 implement an erasure code or forward error correction code (FEC) for recovering data, a storage pool $106_i$ would include n storage devices to store n chunks or data units of a data object $104_i$ and allow for the recovery of the entire data object $104_i$ if k of the data units of the data object $104_i$ are available. This means a storage pool has a reliability rating of n–k, which indicates the number of data units that may be lost and still allow for the recovery of the data object. A storage pool $106_i$ having a higher reliability rating requires a greater number of storage devices to independently store the n data units, which involves greater costs, and can recover a data object $104_i$ if a greater number of data units of the data object are lost than a storage pool having a lower reliability rating. There may be more than two reliability ratings, e.g., sensitive/critical or not sensitive/critical, that indicate a degree of the sensitivity.

The storage server 100 may further include a data classification module 128 to perform a deep inspection of a data object $104_i$ to determine a sensitivity or critical rating of the data based on a natural language classification program that collects and analyzes content in the data objects $104_i$ to provide a predefined classification based on processing of the content. The data classification module 128 may use deep inspection techniques such as IBM® WATSON™ Explorer Content analytics, Sentiment Analytics, Contextual Views based on natural language classification as well as WATSON™ Application Programming Interfaces (APIs) such as speech to text, visual recognition, etc. These techniques help in capturing metadata information from data objects and determining a classification of the data. (IBM and WATSON are trademarks of International Business Machines Corporation throughout the world). The data classification module 128 may determine the extent to which a data object $104_i$ includes sensitive data, such as personal information, financial information, etc., and/or critical data, such as data critical for business or application operations, and then to identify a level of sensitivity/criticalness, such as no sensitivity/criticalness, low sensitivity/criticalness, medium sensitivity/criticalness, high sensitivity/criticalness, etc. The determined level of sensitivity/criticalness comprises a data classification that maps to reliability rating in the data classification-to-reliability rating assignment 400.

In one embodiment, the data classification module 128 may be implemented in the storage server 100 as shown in FIG. 1, where the storage server 100 would read a data object $104_i$ from a storage pool $106_i$ to perform the data classification. In a further embodiment, the data classification module 128 may be implemented at a source server $102_i$ managing the storage pool $106_i$ in which the data object $104_i$ is stored. In a still further embodiment, the data classification module 128 may be implemented in a separate system or in a hardware device at the storage server 100. In such further embodiments, the determined data classification is returned to the storage manager 120 to use to determine a storage pool in which to store the data object There may be any number of message queues $124_i$ and consumers $126_i$ to process the message queues $124_i$, where consumers $126_i$ may process requests from one or more of the message queues $124_i$. In certain embodiments, there may be a separate message queue $124_i$ for each source data set $104_i$.

The database 300 may comprise a No Structured Query Language (No SQL) database, an SQL database, a relational database, objected oriented database, Extended Markup Language (XML) database, and any other suitable database known in the art.

The storage pools $106_1$, $106_2 \ldots 106_n$ may be implemented in different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices implementing the storage pools $106_1$, $106_2$ . . . $106_n$ may comprise heterogeneous storage devices from different vendors and different types of storage devices, such as a first type of storage devices, e.g., hard disk drives, that have a slower data transfer rate than a second type of storage devices, e.g., SSDs.

The storage pools $106_1$, $106_2$ . . . $106_n$ may implement different reliability levels, such as different RAID levels or different erasure code reliability levels. An erasure code reliability level is defined by the number of data units (n) and threshold number of data units (k) of a data object $104_i$ need to recover the entire data object $104_i$. A storage pool having a higher n–k value has a higher reliability, because a higher value of n–k indicates a storage pool can lose more data units, or n–k data units, than a storage pool with a lower n–k value.

The memory 108 may comprise a suitable volatile or non-volatile memory devices, including those described above.

Figure 2:
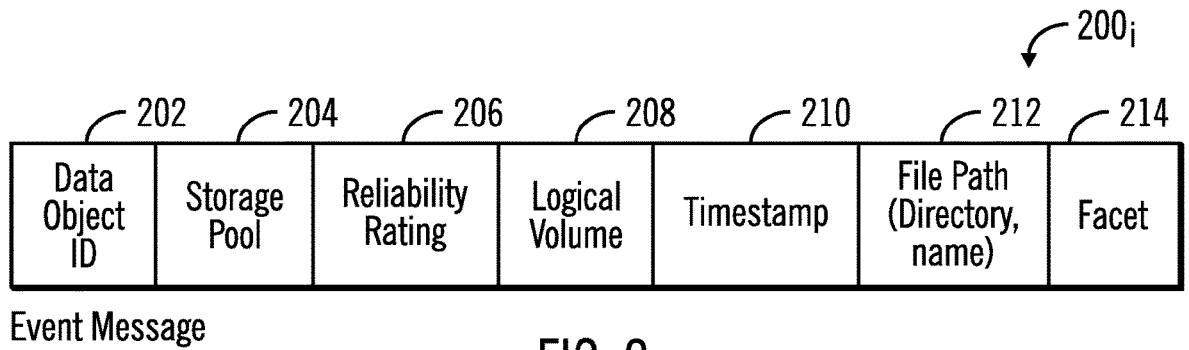
FIG. 2 illustrates an embodiment of an event message.

FIG. 2 illustrates an embodiment of an instance of an event message $200_i$ generated by an event manager $108_i$ to provide to the storage manager 120 to use to determine a storage pool $106_i$ in which to store a data object, and includes a data object ID 202 identifying a data object $104_i$; storage pool 204 in which the data object 202 is stored; a reliability rating 206 of the storage pool 204 having the data object 202; a logical volume 208 in which the data object is stored, e.g., logical unit number (LUN), volume, logical drive, etc.; a timestamp 210 indicating a time the data object 202 was created and/or last modified; a file path 212, such as a directory name, including the data object 202; and a facet 214 providing information generated through deep inspection of a data object 202, such as with the data classification module 128, that provides a descriptor of sensitive/critical data in the data object 202, such as social security numbers, financial information, personal information, type of application data, etc.

Figure 3:
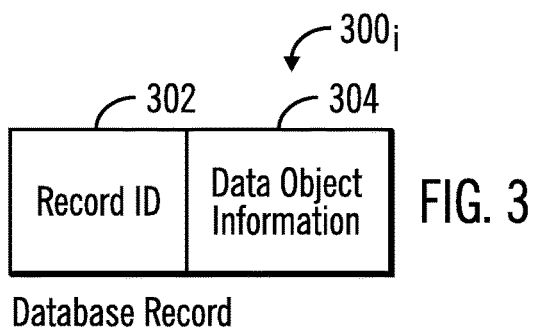
FIG. 3 illustrates an embodiment of database record.

FIG. 3 illustrates an embodiment of a database record $300_i$ in the database 300 and includes a record identifier (ID) 302 identifying the database record $300_i$ in the database 300 and data object information 304, which may comprise all or some of the information in the event message 200 in fields of the database record $300_i$. The database 300 may also include an index to allow fast searching of records $300_i$ based on relevant backup key/value pairs, such as the time the database object was last updated, data type, source data set, etc.

Figure 4:
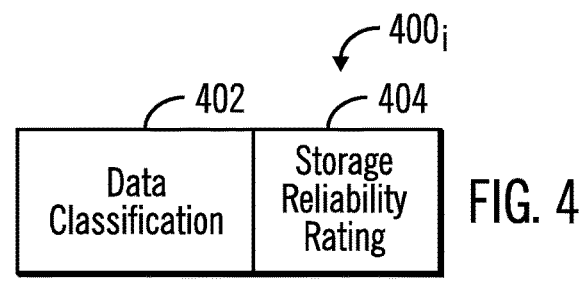
FIG. 4 illustrates an embodiment of an assignment of a data classification to a storage reliability rating.

FIG. 4 illustrates an embodiment of an entry $400_i$ in the data classification-to-reliability rating assignment 400 including a data classification 402 and storage reliability rating 404, such as indicating a number of data units of a data object $104_i$ that may be lost and still recover the data object, where a higher rating indicates that more data units may be lost than a lower rating.

Figure 5:
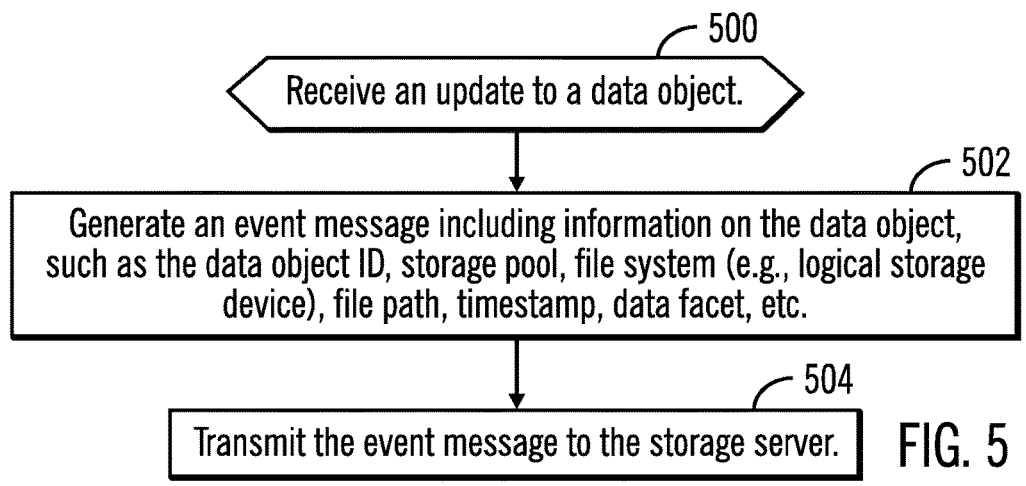
FIG. 5 illustrates an embodiment of operations to generate an event message for an updated data object.

FIG. 5 illustrates an embodiment of operations performed by an event manager $108_i$ to generate an event message 200 for an update to a data object in a source data set $104_i$ managed by the event manager $108_i$. Upon receiving (at block 500) the update to a data object, the event manager $108_i$ generates (at block 502) an event message 200 including information on the data object, such as the data object ID 202, storage pool 204 storing the data object 202, reliability rating 206 of the storage pool, logical volume 208, timestamp 210, file path 212, and facet 214. The generated event message 200 is sent (at block 504) to the storage server 100 to dispatch to one of the message queues $124_1$, $124_2$ . . . $124_m$.

With the embodiment of FIG. 5, the event manager $108_i$ may generate the event message 200 immediately upon receiving the update to the data object before the update is applied to the storage pool $106_i$. In this way, the event messages 200 provide real time information on updates to the data objects to the storage server 100 so that the database 300 has current information on changed data objects.

Figure 6:
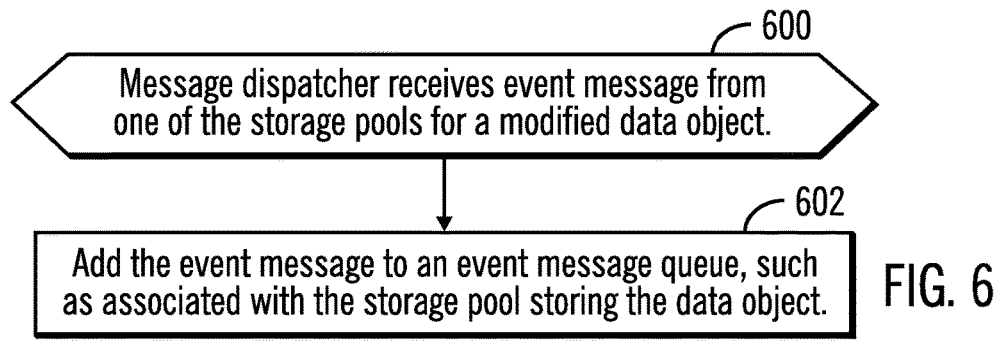
FIG. 6 illustrates an embodiment of operations to dispatch an event message to a message queue.

FIG. 6 illustrates an embodiment of operations performed by the event message dispatcher 118 to process an event message 200 received from an event manager $108_i$ having information on an update to a data object in a source data set $104_i$. Upon receiving (at block 600) an event message 200, the event message dispatcher 118 adds (at block 602) the event message 200 to an event message queue $124_i$. The event message queue $124_i$ may be selected based on workload load balancing to evenly distribute messages 200 among the message queues or having storage pools assigned to message queues, so an event message is added to the message queue $124_i$ associated with the storage pool $106_i$ in which the data object $104_i$ of the event message is stored.

Figure 7:
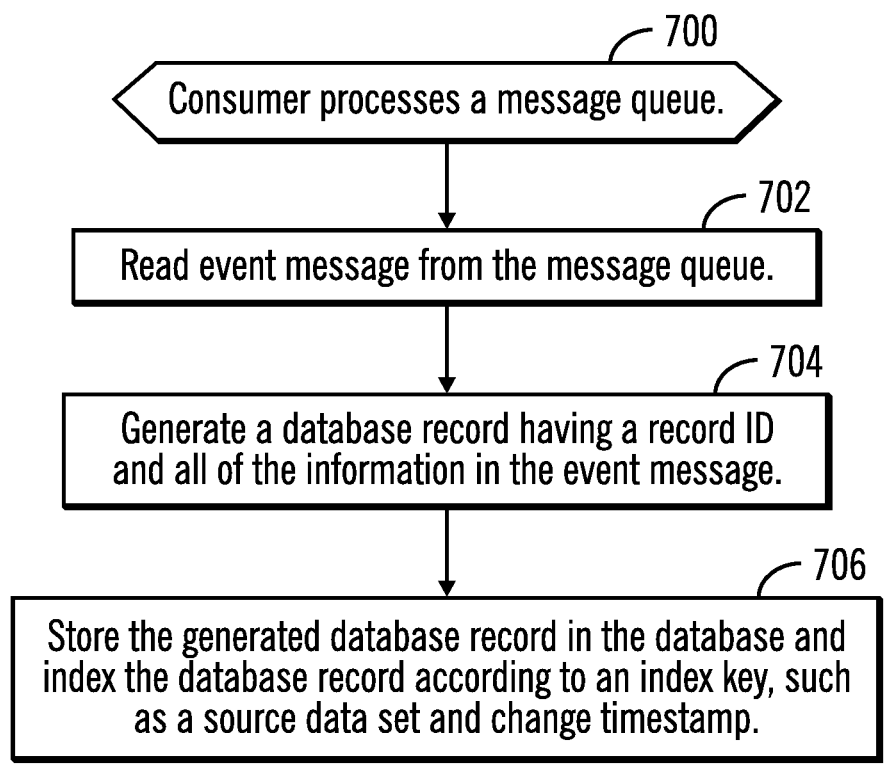
FIG. 7 illustrates an embodiment of operations to process a message queue.

FIG. 7 illustrates an embodiment of operations performed by a consumer $126_i$ process to process one or more event messages 200 in a message queue $124_i$. Upon a consumer $126_i$ processing (at block 700) a message queue $124_i$, the consumer $126_i$ reads (at block 702) an event message 200 from the message queue $124_i$ and generates (at block 704) a database record $300_i$ having a record ID 302 and database object information 304 comprising the information 202, 204, 206, 208, 210, 212, and 214 in the received event message 200. The generated database record $300_i$ is stored (at block 706) in the database 300 and a database index according to an index key, such as a source data set, change timestamp, etc.

With the embodiments of FIGS. 5, 6, and 7, information on real-time updates to data objects are generated and provided to the storage server 100 to store in the database 300. In this way, the database 300 immediately reflects the current state of updates to data objects to use to determine a storage pool for the data objects based on an investigation criteria applied to the metadata of the data object in the event message 200 and deep inspection of the data in the data objects. Further, the event message dispatcher 118 receives event messages 200 from different storage pools $106_1$, e.g., 204, 206, 208, 210, 212, 214 that indicates a likelihood the data object would have sensitive and/or critical data to warrant further deep inspection with the data classification module 128. A result set is received (at block 804) of database records $300_i$ having data object information 304 satisfying the inspection criteria. For each database record $300_i$ satisfying the inspection criteria, the changed data object 202 is read (at block 806) from the storage pool 204 and the data classification module 128 is invoked (at block 808) to perform deep data inspection of the data object to determine a data classification, e.g., not sensitive/critical, low sensitive/critical, medium sensitive/critical, high sensitive/critical.

The inspection criteria may indicate to perform deep data inspection based on the data object information 304 having certain values. In alternative embodiments, the inspection criteria may utilize an algorithm, such as a machine learning algorithm, to determine a likelihood of sensitive/critical data in a data object based on the data object information 304, or metadata in the event message 200.

The storage manager 120 upon receiving the data classification level from the data classification module 128 determines (at block 810) the reliability rating 404 associated with the determined data classification 402. If (at block 812) the current storage pool $106_i$ storing the data object $104_i$ has a reliability rating, e.g., 206, not satisfying (at block 806) the determined reliability rating 404, then the storage manager 120 may move (at block 814) the data object $104_i$ from the current storage pool $106_i$ to a storage pool having the determined reliability rating. If (at block 812) the current storage pool reliability rating satisfies the determined reliability rating for the new data classification, then control ends.

In one embodiment, the storage manager 120 may move the data object if the determined reliability rating is different from the current storage pool reliability rating, so that the data object is moved to a storage pool having a lower reliability rating than the current storage pool if the new data classification is lower and moves to a storage pool having a higher reliability rating than the current storage pool if the new data classification is higher. In another embodiment, if the current storage pool rating satisfies the new data classification level reliability rating, such as is equal to or greater than the new reliability rating, then the data object may remain in the current storage pool.

Figure 8:
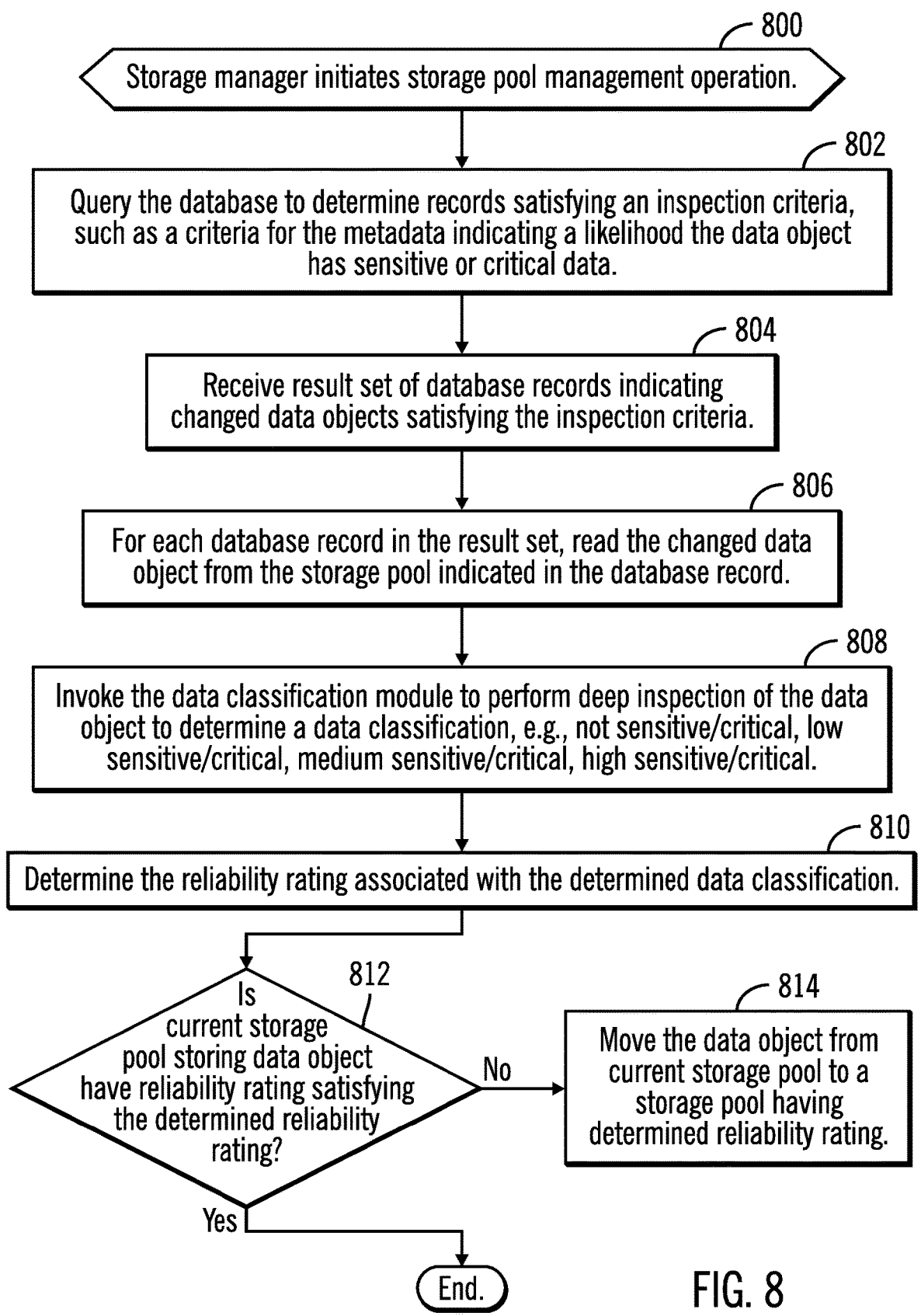
FIG. 8 illustrates an embodiment of operations to determine a storage pool for a changed data object.

With the embodiments of FIG. 8, the storage manager 120 may ensure changed data objects are stored in storage pools having a reliability rating satisfying the reliability rating of the data classification level based on the changed data object, which may have changed due to changes to the data in the data object. To conserve computational resources, an initial inspection criteria may be used to filter those data objects considered for deep data inspection based on metadata stored in the database record $300_i$ for the data object $104_i$ to determine whether the metadata 204-214 indicates a likelihood there is sensitive/critical data in the object that needs to be further classified. Further, because the database 300 provides real-time information on updated data objects, the data objects subject to data classification indicated in the database 300 comprise the most recent modified data objects.

Figure 9:
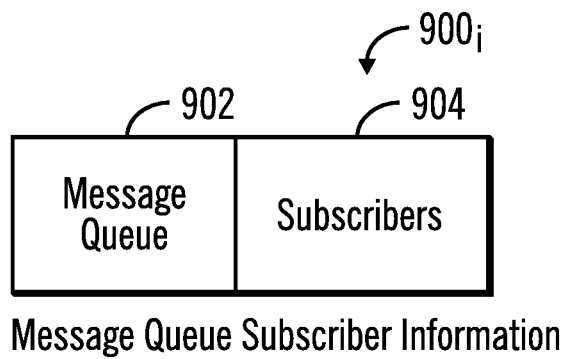
FIG. 9 illustrates an embodiment of message queue subscriber information.
Figure 10:
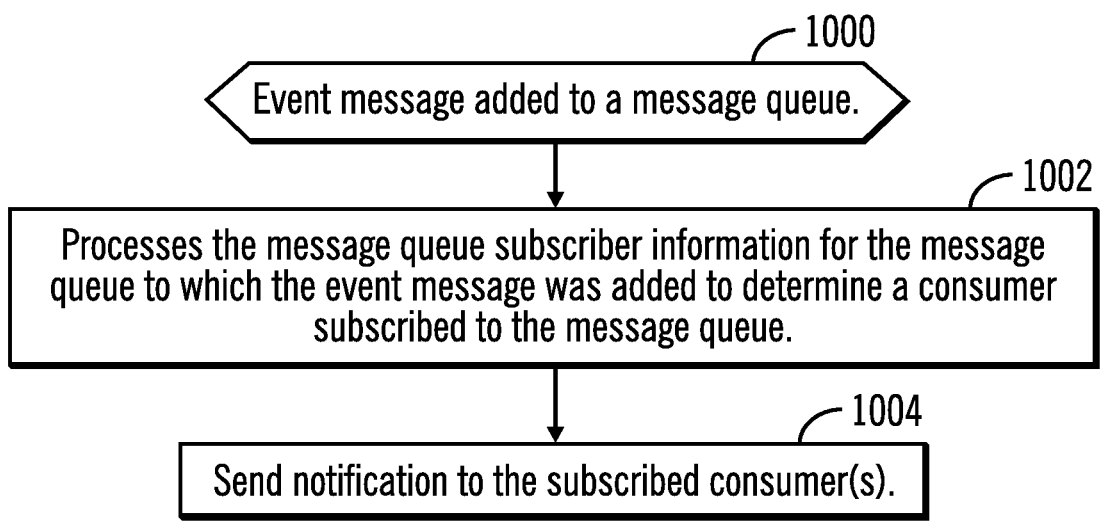
FIG. 10 illustrates an embodiment of operations to provide a notification for an event message added to a message queue.
Figure 11:
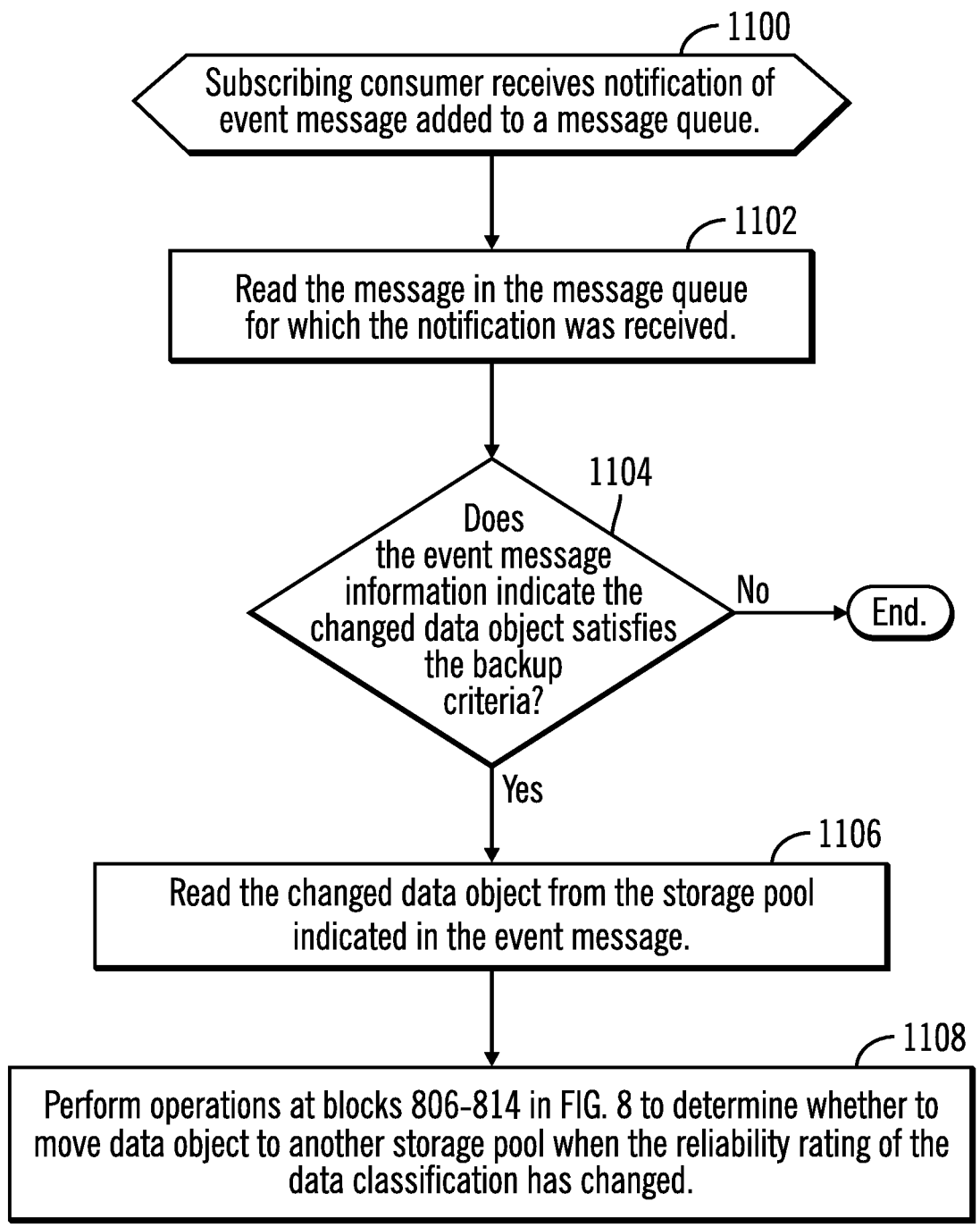
FIG. 11 illustrates an embodiment of operations to process a notification of an event message added to a message queue to determine whether to move a data object to a different storage pool.

FIGS. 9, 10, and 11 illustrate an alternative embodiment where the changed data objects to backup are determined directly from the event messages 200 in the message queues $124_1$, $124_2$ ... $124_m$ without having to query the database 300, which allows for a faster determination of the data objects to backup, such as in real time from when the data object was changed. In certain embodiments, the changed data object may be subject to deep data inspection to determine the data classification even before the changed data object in a memory of the source servers $102_1$, $102_2$ ... $102_n$ has been written to the storage pools $106_1$, $106_2$ ... $106_n$.

FIG. 9 illustrates an embodiment of message queue subscriber information $900_i$ the event message dispatcher 118 maintains for each message queue $124_i$ to determine consumers $126_1$, $126_2$ ... $126_m$ that subscribe to the message queues $124_i$. The event message dispatcher 118 may maintain one instance of message queue subscriber information $900_i$ for each message queue $124_i$. The message queue subscriber information $900_i$ includes a message queue 902 and a list of zero or more consumers 904 that are to be notified when an event message 200 is added to a message queue $124_i$.

FIG. 10 illustrates an embodiment of operations performed by the event message dispatcher 118 after adding a received event message 200 to an event message queue $124_i$, such as after performing the operations of FIG. 6. After adding (at block 1000) the event message 200 to the event message queue $124_i$, the event message dispatcher 118 processes (at block 1002) the message queue subscriber information $900_i$ for the message queue $124_i$ to which the event message 200 was added to determine a consumer 904 subscribed to the message queue 902. A notification is sent (at block 1004) to the determined subscribed consumers 904 to process.

FIG. 11 illustrates an embodiment of operations performed by a consumer $126_i$ or the storage manager 120 to process the notification sent at block 1004 of an event message $200_i$ added to the event message queue $124_i$. Upon a subscribing consumer $126_i$ receiving (at block 1100) the notification, the subscribed consumer $126_i$ reads (at block 1102) the message 200 in the message queue $124_1$ for which the notification was received. If (at block 1104) the event message information 202 ... 214 indicates the changed data object satisfies an inspection criteria indicating the data object likely has sensitive and/or critical data, then the consumer $126_i$ or storage manager 120 (or a source server $102_i$) reads (at block 1106) the changed data object from the storage pool 204 at the file path 212 indicated in the event message 200. The consumer $126_i$ or the storage manager 120 performs (at block 1108) the operations at blocks 806-814 in FIG. 8 to determine whether to move data object to another storage pool when the reliability rating of the data classification has changed.

In certain embodiments, multiple consumers may receive the notification of an event message 200 added to a message queue $120_i$ to allow different consumers $126_i$ to independently determine whether the inspection criteria is satisfied to invoke deep inspection to determine whether the changed data object should be moved to a different storage pool $106_j$ having a reliability rating satisfying that of the changed data object.

With the embodiment of FIGS. 9, 10, and 11, real-time reporting of changes to data objects in event message are processed by consumers $126_1$, $126_2$ ... $126_m$ subscribed to the message queue $124_i$ to which the real-time event message 200 is added to allow for an immediate determination of whether the data object satisfies the inspection criteria and should be subject to deep inspection. In this way, there are no delays to determine whether to move the data object to a new storage pool after it is updated because the object is considered for a new storage pool assignment immediately upon the consumer $126_i$ being alerted of the change to the data object in the message queue $124_i$. Further, in certain implementations, because the event message 200 is provided immediately to the storage server 100 even before the changed data object is stored in the storage pool $106_i$, the determination to move the changed data object to a new storage pool $106_j$ may be performed before the changed data object is written to the storage pool $106_i$ to which the data object $104_i$ to inspect is currently assigned.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
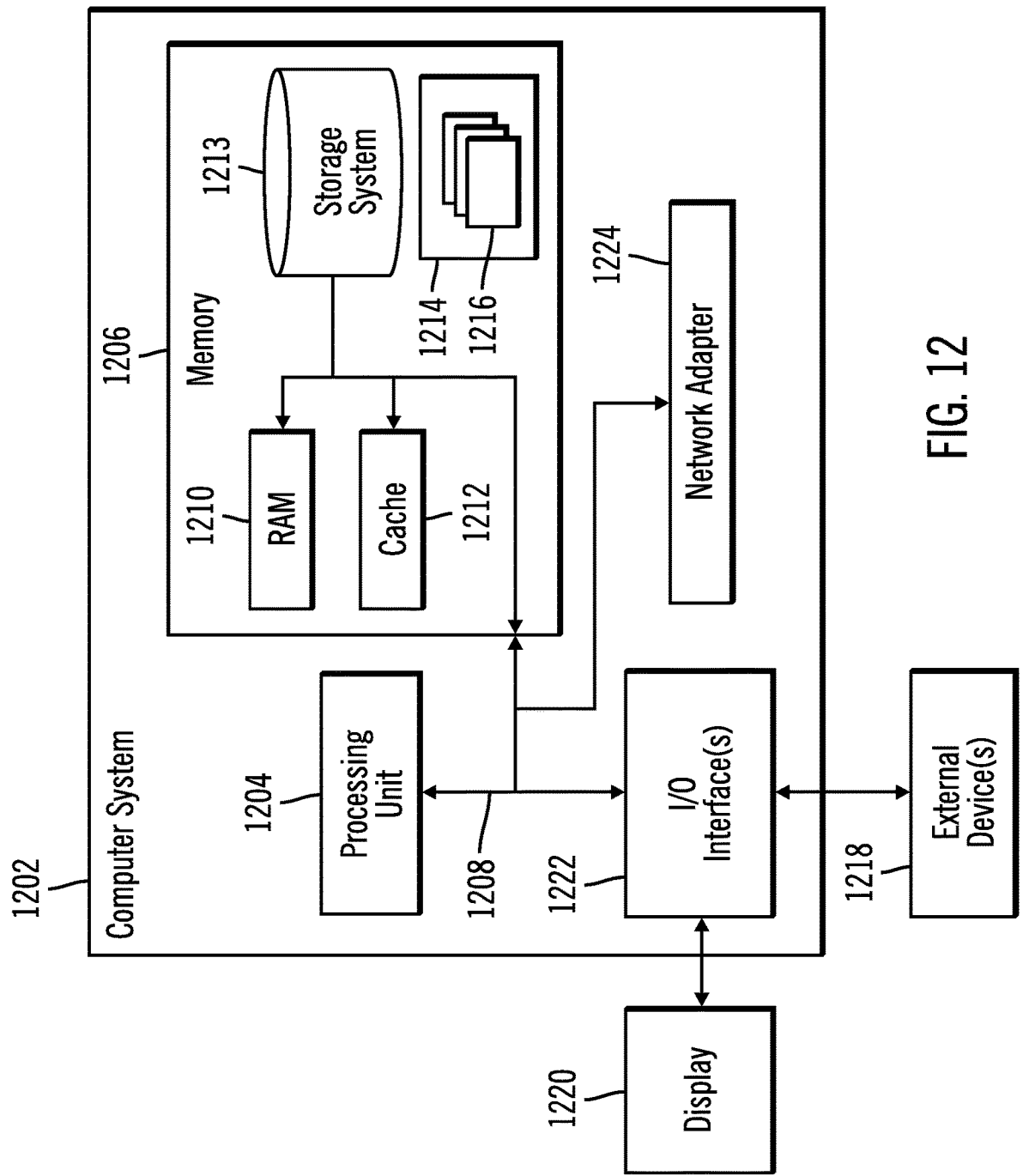
FIG. 12 illustrates a computing environment in which the components of FIG. 1 may be implemented.

The computational components of FIG. 1, including the storage server 100, hosts 110, and source servers $102_1$, $102_2 \ldots 102_n$ may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining a storage pool in which to store a data object, wherein the computer program product comprises a computer readable storage medium having computer readable program code embodied therein that when executed performs operations, the operations comprising:

receiving event messages, wherein each event message includes metadata on a data object updated in a storage pool of a plurality of storage pools, at least two of the storage pools have different reliability ratings;

adding the event messages to a message queue;

determining a data classification of a changed data object indicated in an event message in the message queue; and moving the changed data object to a storage pool having a reliability rating satisfying a reliability rating associated with the data classification of the changed data object.

2. The computer program product of claim 1, wherein the operations further comprise:

determining, from the event messages in the message queue, changed data objects having metadata indicating the changed data object is likely to have a data classification associated with a high reliability storage pool, wherein the determining the data classification is performed in response to determining that the metadata indicates the changed data object is likely to have a data classification associated with a high reliability storage pool.

3. The computer program product to claim 2, wherein the metadata indicating whether the changed data object is likely to have a data classification associated with a high reliability storage pool comprises at least a plurality of: an identity of a storage storing the changed data object; a file path of the data object; and a facet describing data in the changed data object.

4. The computer program product of claim 1, wherein the operations further comprise:

determining whether the changed data object is stored in a storage pool having a reliability rating satisfying the reliability rating associated with the data classification, wherein the moving the changed data object is performed in response to determining that the changed data object is stored in a storage pool having a reliability rating that does not satisfy the reliability rating associated with the data classification.

5. The computer program product of claim 1, wherein the operations further comprise:

maintaining an association of data classifications to storage pool reliability ratings, wherein each data object is stored in a storage pool having a storage pool reliability rating satisfying a storage pool reliability rating associated with a data classification of the data object.

6. The computer program product of claim 5, wherein a reliability rating indicates a number of units of data of a data object that can be lost with the data object still being recoverable, wherein a higher reliability rating indicates that a greater number of units of data can be lost than with a lower reliability rating.

7. The computer program product of claim 1, wherein the determining the data classification comprises initiating a deep content inspection of the changed data object to determine a data classification of the changed data object.

8. The computer program product of claim 1, wherein the data classification indicates one of a plurality of levels indicating at least one of a sensitivity level of the changed data object and a criticalness of the changed data object, wherein sensitivity levels associated with a higher data sensitivity or higher data criticalness are assigned a higher reliability rating than sensitivity levels associated with lower data sensitivity or lower criticalness.

9. The computer program product of claim 1, wherein a data object assigned to a storage pool is divided into data units to store on a plurality of storage devices, wherein a reliability rating indicates a maximum number of data units that can be lost and still allow for recovery of the data object, wherein a first reliability rating is higher than a second reliability rating if the first reliability rating allows for a greater number of data units to be lost and still recover the data object than the second reliability rating.

10. The computer program product of claim 9, wherein a forward error correction algorithm is used to divide a data object into data units and compute parity data for the data units to store on the plurality of storage devices, wherein each reliability rating indicates a width n of a number of data units into which a data object is divided and a threshold k indicates a number of the data units needed to retrieve the data object, wherein the reliability rating is based on a difference of n−k.

11. The computer program product of claim 1, wherein there are a plurality of message queues and consumer processes, each of the consumer processes assigned to process event messages from one of the message queues, wherein the message queues receive event messages for changed data objects stored in storage pools, wherein the operations further comprise:

in response to adding one of the event messages to one of the message queues, determining a consumer process subscribed to the message queue to which the event message was added; and sending a notification to the determined consumer process to cause the determined consumer process to read the event message added to the message queue.

12. The computer program product of claim 1, wherein the event messages are generated immediately after modifying changed data objects to provide information on real-time changes to changed data objects to the message queue and a database.

13. A system for determining a storage pool in which to store a data object, comprising:

a processor; and a computer readable storage medium having computer readable program code embodied therein that when executed by the processor performs operations, the operations comprising:

receiving event messages, wherein each event message includes metadata on a data object updated in a storage pool of a plurality of storage pools, at least two of the storage pools have different reliability ratings;

adding the event messages to a message queue;

determining a data classification of a changed data object indicated in an event message in the message queue; and moving the changed data object to a storage pool having a reliability rating satisfying a reliability rating associated with the data classification of the changed data object.

14. The system of claim 13, wherein the operations further comprise:

determining, from the event messages in the message queue, a changed data object having metadata indicating the changed data object is likely to have a data classification associated with a high reliability storage pool, wherein the determining the data classification is performed in response to determining that the metadata indicates the changed data object is likely to have a data classification associated with a high reliability storage pool.

15. The system of claim 13, wherein the operations further comprise:
determining whether the changed data object is stored in a storage pool having a reliability rating satisfying the reliability rating associated with the data classification, wherein the moving the changed data object is performed in response to determining that the changed data object is stored in a storage pool having a reliability rating that does not satisfy the reliability rating associated with the data classification.

16. The system of claim 13, wherein the operations further comprise:
maintaining an association of data classifications to storage pool reliability ratings, wherein each data object is stored in a storage pool having a storage pool reliability rating satisfying a storage pool reliability rating associated with a data classification of the data object.

17. The system of claim 16, wherein a reliability rating indicates a number of units of data of a data object that can be lost with the data object still being recoverable, wherein a higher reliability rating indicates that a greater number of units of data can be lost than with a lower reliability rating.

18. The system of claim 13, wherein a data object assigned to a storage pool is divided into data units to store on a plurality of storage devices, wherein a reliability rating indicates a maximum number of data units that can be lost and still allow for recovery of the data object, wherein a first reliability rating is higher than a second reliability rating if the first reliability rating allows for a greater number of data units to be lost and still recover the data object than the second reliability rating.

19. The system of claim 18, wherein a forward error correction algorithm is used to divide a data object into data units and compute parity data for the data units to store on the plurality of storage devices, wherein each reliability rating indicates a width n of a number of data units into which a data object is divided and a threshold k indicates a number of the data units needed to retrieve the data object, wherein the reliability rating is based on a difference of n–k.

20. A method for determining a storage pool in which to store a data object, comprising:
receiving event messages, wherein each event message includes metadata on a data object updated in a storage pool of a plurality of storage pools, at least two of the storage pools have different reliability ratings;
adding the event messages to a message queue;
determining a data classification of a changed data object indicated in an event message in the message queue; and
moving the changed data object to a storage pool having a reliability rating satisfying a reliability rating associated with the data classification of the changed data object.

21. The method of claim 20, further comprising:
determining, from the event messages in the message queue, changed data objects having metadata indicating the changed data object is likely to have a data classification associated with a high reliability storage pool, wherein the determining the data classification is performed in response to determining that the metadata indicates the changed data object is likely to have a data classification associated with a high reliability storage pool.

22. The method of claim 20, further comprising:
determining whether the changed data object is stored in a storage pool having a reliability rating satisfying the reliability rating associated with the data classification, wherein the moving the changed data object is performed in response to determining that the changed data object is stored in a storage pool having a reliability rating that does not satisfy the reliability rating associated with the data classification.

23. The method of claim 20, further comprising:
maintaining an association of data classifications to storage pool reliability ratings, wherein each data object is stored in a storage pool having a storage pool reliability rating satisfying a storage pool reliability rating associated with a data classification of the data object.

24. The method of claim 23, wherein a reliability rating indicates a number of units of data of a data object that can be lost with the data object still being recoverable, wherein a higher reliability rating indicates that a greater number of units of data can be lost than with a lower reliability rating.

25. The method of claim 20, wherein a data object assigned to a storage pool is divided into data units to store on a plurality of storage devices, wherein a reliability rating indicates a maximum number of data units that can be lost and still allow for recovery of the data object, wherein a first reliability rating is higher than a second reliability rating if the first reliability rating allows for a greater number of data units to be lost and still recover the data object than the second reliability rating.

26. The method of claim 25, wherein a forward error correction algorithm is used to divide a data object into data units and compute parity data for the data units to store on the plurality of storage devices, wherein each reliability rating indicates a width n of a number of data units into which a data object is divided and a threshold k indicates.

* * * * *